Sept. 22, 1931. A. H. HATCHETT, SR 1,823,937
COMBINED FISH LURE AND SIGNAL
Filed April 30, 1930
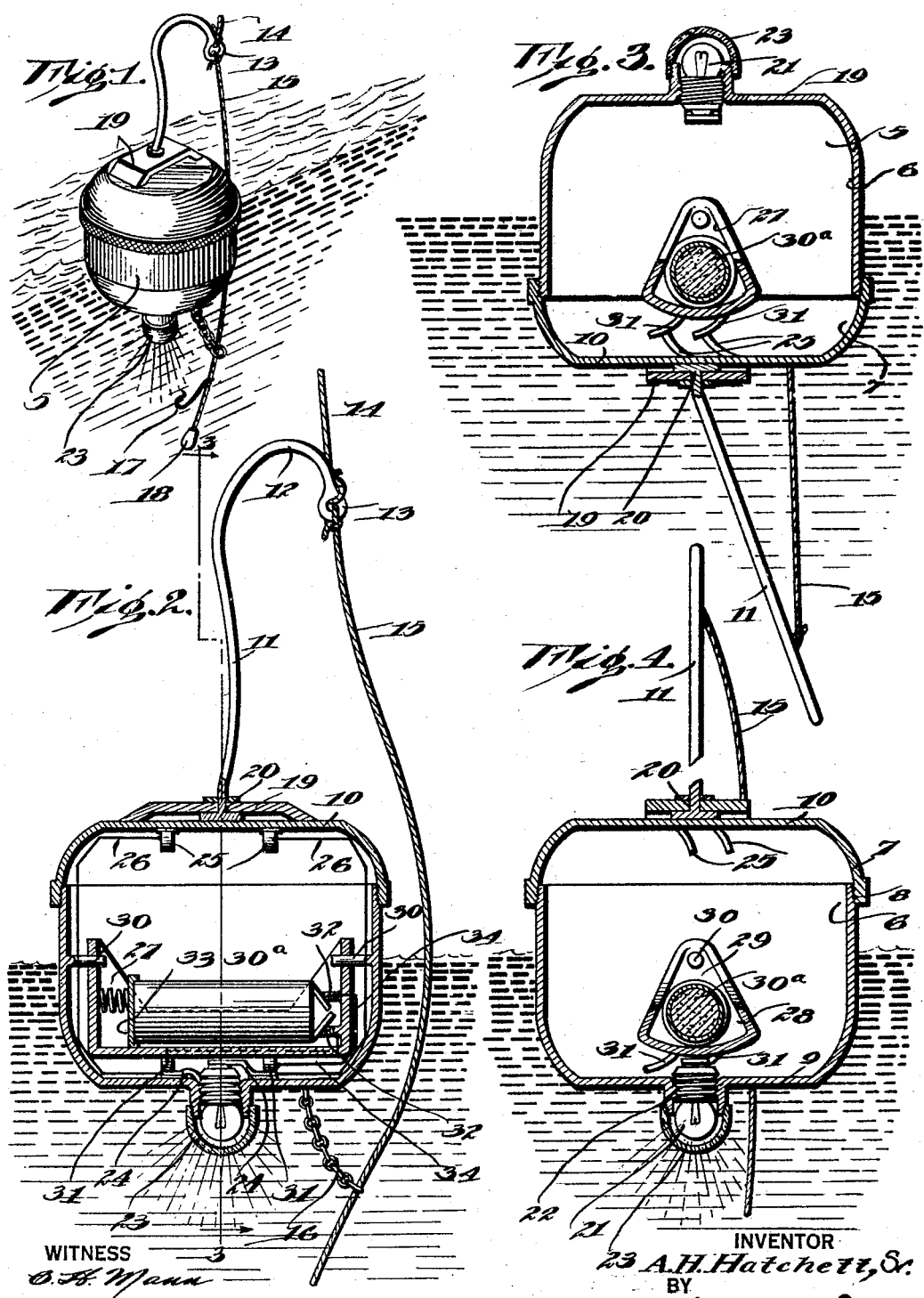
INVENTOR
A. H. Hatchett, Sr.
BY
ATTORNEY Patented Sept. 22, 1931

1,823,937

UNITED STATES PATENT OFFICE

ANDREW H. HATCHETT, SR., OF CLEVELAND, OHIO

COMBINED FISH LURE AND SIGNAL

Application filed April 30, 1930. Serial No. 448,660.

My invention is a combined fish lure and signal and has as one of its objects the provision of a device equipped with a lamp whose rays normally are directed into the water to attract the fish but which is operable to expose the light rays to the fisherman to indicate that a fish has been hooked.

Further the invention provides a device of this character embodying a circuit closer which is responsive to the motion of the water to alternately open and close an electric circuit to a light source thus producing an intermittent light beneath the water to attract the fish.

The invention also contemplates a combined fish lure and signal embodying a hollow float having a self contained electric lamp equipment whose light rays normally project from the bottom of the float but which project upwardly from the water's surface upon inversion of the float incident to the hooking of a fish.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a perspective of the invention in normal position on the water,

Figure 2 is a vertical sectional view of the same,

Figure 3 is a vertical section taken on line 3—3 of Figure 2 and illustrating the device in signalling position, and Figure 4 is a vertical sectional view also taken on line 3—3 of Figure 2.

Referring to the invention in detail a substantially cylindrical hollow float 5 preferably formed of light metal such as aluminum is provided. The float 5 comprises complementary sections 6 and 7 having screw threaded engagement as at 8. To retain the float in an upright position in the water the bottom wall 9 of the section 6 is flat. Similarly the top wall 10 of the section 7 is flat to retain the float in an upright position when in the inverted position illustrated in Figure 3.

Projecting from the top wall of the section 7 is an upstanding shank 11 having an overhanging downwardly curved arm 12 terminating in an eye 13 to which a conventional line 14 is attached. Also secured to the eye 13 and extending downwardly along the float is a flexible element 15 which passes through one of the links of a chain 16 depending from the under face of the bottom wall 9. A conventional hook 17 and sinker 18 are carried by the flexible element to extend beneath the water's surface. While in this instance, only one hook 17 is provided, any number of the same may be employed if desired. To permit the flexible element 15 to have lateral play, the shank 11 is revolubly mounted in a raised plate 19 secured to the top wall, by a suitable swivel connection 20.

To illuminate the water beneath the float and hence lure fish to the zone of the hook, a vertically disposed illuminating bulb 21 is received in a socket 22 formed centrally on the bottom wall 9. A relatively thick glass casing 23 overlies the illuminating bulb and is threaded upon the socket to protect the bulb against breakage. As particularly illustrated in Figure 2, the illuminating bulb is engaged by laterally disposed contacts 24 insulated from the bottom wall 9. These contacts 24 are connected in series with a pair of fixed contacts 25 by electrical conductors 26.

For the purpose of completing an electrical circuit through the contacts 24 or 25, a gravity actuated circuit closer 27 is journalled in the section 6 of the float. This circuit closer comprises a channel shaped member 28 having vertically disposed upstanding arms 29 loosely supported on horizontally disposed trunnions 30 projecting from the walls of the section 6 at diametrically opposite points. Depending from the under face of the bottom wall of the channel shaped member is a pair of longitudinally curved resilient contacts 31 which normally contact with the contacts 24.

A conventional battery 30a is arranged within the channel shaped member and is pressed into electrical contact with a pair of studs 32 formed upon the inner face of one of the arms 29 by means of a resiliently urged follower 33 engaging the base end of the battery. Electrical energy is conducted from the battery to the contacts 31 by means of electrical conductors 34 leading from the studs 32 to these contacts 31.

With the device supported on the water as illustrated in Figures 1 and 2 the circuit will be completed to illuminate the bulb 21 to illuminate the water in proximity to the hook 17. Due to the motion of the water the float will rock back and forth to alternately engage and disengage the contacts 24 from the contacts 31 causing the bulb to be intermittently lighted. It will be apparent that the intermittent illumination of the bulb will attract fish to the zone of the device. When a fish becomes hooked, a sufficient strain will be placed on the flexible element 15 to rotate the float in the water to dispose the illuminating bulb above the water's surface as disclosed in Figure 3. With the float in this position the contacts 25 will be engaged by the contacts 31 to complete the circuit to the lamp and thereby signal the fisherman that a fish has been caught.

What is claimed is:—

1. In a combined fish lure and signal, a float for attachment to a fishing line, an illuminating bulb carried by the bottom wall of the float for illuminating the water to lure the fish, a member pivoted to the float to swing about a horizontal axis, spaced contacts carried thereby having electrical connection with a source of electrical energy to normally complete an electrical circuit to the bulb, the float being inverted in the water to expose the illuminating bulb to view incident to the strain placed on the fishing line by a fish.

2. In a fishing device, a float, an illuminating bulb projecting from the bottom thereof, a member pivoted in the float to swing about a horizontal axis, spaced contacts carried thereby having electrical connection with a source of electrical energy to normally complete an electrical circuit to the bulb.

3. In a fishing device, a float, an illuminating bulb projecting from the bottom thereof, a member pivoted in the float to swing about a horizontal axis, spaced contacts carried thereby having electrical connection with a source of electrical energy to normally complete an electrical circuit to the bulb, and a pair of contacts depending from the top wall of the float to be engaged by the first mentioned contacts upon rotation of the float to inverted position.

4. In a fishing device, a hollow float, an illuminating projecting from the bottom thereof, a channel shaped member pivotally connected with the float, and a battery held in the channel shaped member, contacts depending from the bottom of the channel shaped member and having electrical connection with the battery and normally completing a circuit to the bulb.

5. In a fishing device, a hollow float, an illuminating bulb projecting from the bottom thereof, a channel shaped member pivotally connected with the float, a battery held in the channel shaped member, contacts depending from the bottom of the channel shaped member and having electrical connection with the battery and normally completing a circuit to the bulb, and a second pair of contacts depending from the top wall of the float and electrically connected with the illuminating bulb whereby upon inversion of the float a circuit will be completed to the illuminating bulb.

6. In a combined fish lure and signal, a float, a normally illuminated bulb projecting from the bottom thereof, an upstanding arm swivelled to the top wall of the float for attachment to a fishing line, the float being inverted to dispose the illuminating bulb to view when the strain of a hooked fish has been placed on the arm.

ANDREW H. HATCHETT, Sr.